United States Patent [19]

Concannon et al.

[11] 4,425,448

[45] Jan. 10, 1984

[54] POLYTETRAFLUOROETHYLENE RESIN WITH DEGRADATION RETARDER

[75] Inventors: Thomas P. Concannon, Newtown Square; Mitzie K. Rummel, Secane, both of Pa.

[73] Assignee: E. I. Du Pont de Nemours & Co., Wilmington, Del.

[21] Appl. No.: 380,353

[22] Filed: May 20, 1982

[51] Int. Cl.$^3$ .................... C08K 3/34; C08K 3/10; C08L 27/18

[52] U.S. Cl. ................... 523/218; 523/310; 524/413; 524/431; 524/443; 524/449; 524/450; 524/546

[58] Field of Search ............ 523/310, 218; 524/546, 524/431, 450, 449, 443, 413

[56] References Cited

U.S. PATENT DOCUMENTS

| | | | |
|---|---|---|---|
| 2,867,605 | 1/1959 | Safford | 524/450 |
| 3,245,946 | 4/1966 | O'Conner et al. | 523/211 |
| 3,428,595 | 2/1969 | Tsukada et al. | 524/450 |
| 3,538,028 | 11/1970 | Morgan | 524/443 |
| 3,850,867 | 11/1974 | Hartman | 524/443 |
| 4,000,100 | 12/1976 | Baldyga | 524/450 |
| 4,169,083 | 9/1979 | Vassiliou | 524/546 |
| 4,180,609 | 12/1979 | Vassiliou | 524/449 |
| 4,248,763 | 2/1981 | Yoshimura et al. | 524/546 |
| 4,276,214 | 6/1981 | Yoshimura et al. | 524/546 |
| 4,307,010 | 12/1981 | Sandler et al. | 524/450 |
| 4,338,226 | 7/1982 | Worschech et al. | 524/450 |
| 4,371,656 | 2/1983 | Kashiwase et al. | 524/450 |

FOREIGN PATENT DOCUMENTS

| | | | |
|---|---|---|---|
| 6493 | 9/1980 | European Pat. Off. | |
| 54-34356 | 3/1979 | Japan . | |
| 54-149745 | 11/1979 | Japan . | |
| 55-164236 | 12/1980 | Japan | 524/443 |
| 56-147851 | 11/1981 | Japan . | |
| 57-25346 | 2/1982 | Japan . | |
| 57-28145 | 2/1982 | Japan . | |
| 98761 | 8/1961 | Netherlands | 524/450 |

OTHER PUBLICATIONS

Chem. Abst. 94-17688t Vassilou Eur. Pat. 22257 Jan. 1981.

Chem. Abst. 85-200552g Hamamoto et al., Apr. 1976, Japan K76-47431.

Chem. Abst. 92-148681t (1980), Hirokane et al., Japan Kokai 79,149745.

Kunststoff-Hundbuch Band XI, p. 409, Carl Hanser Verlag-Munich (1971).

*Primary Examiner*—Melvyn I. Marquis
*Assistant Examiner*—Herbert J. Lilling

[57] ABSTRACT

Zeolites, including ultramarine blue, retard the oxidative degradation of polytetrafluoroethylene resin (PTFE) at elevated temperatures. Coating compositions of PTFE, zeolites, acrylic resin and iron-containing pigments are provided.

11 Claims, No Drawings

POLYTETRAFLUOROETHYLENE RESIN WITH DEGRADATION RETARDER

BACKGROUND

This invention relates to perfluorocarbon resin compositions containing degradation retarders. More particularly it relates to such compositions of zeolites and polytetrafluoroethylene (PTFE) resin.

Various materials have been found to be useful in retarding the degradation of many polymer systems upon exposure to elevated temperatures or to radiation, particularly ultraviolet light. Often oxygen from the air enhances degradation.

Organo-sulfur compounds and various organo-metallic compounds and hindered amines are used to retard degradation of polymer meant to be used at ordinary temperatures such as 0°-100° C. by stabilizing the polymer against the effects of ultraviolet light. At higher application temperatures, rubber, plastics, and such hydrogen-containing halogenated hydrocarbon resins as polyvinyl chloride (PVC), polyvinyl fluoride (PVF) and polyvinylidene fluoride ($PVF_2$) have been protected from degradation by the use of various types of zeolites. Some patent references say it is important to use zeolites which have been activated by driving off more or less of the contained water of hydration; others say they should be unactivated. Some say the zeolites should be ion-exchanged with monovalent metals like sodium; others say divalent metals like calcium are necessary. Some say at least minimum ion exchange capacity is important; some use two types of zeolites with differing pore size and water content, and still others also require additional retarders to work in conjunction with the zeolites.

However, the patents and publications described above deal with hydrogen-containing resins and not with perfluorocarbon resins such as PTFE. Partially because of the lack of hydrogen, perfluorocarbon resins such as PTFE can be used continuously at much higher temperatures than $PVF_2$ and the others without substantial loss of function, perhaps 260° C. for PTFE versus 150° C. for $PVF_2$ and PVF, and 80°-120° C. for PVC. While the mechanisms of oxidative and thermal degradation of perfluorocarbon resins may not be completely understood, they do not include to a substantial extent one of the primary mechanisms in PVC, PVF and $PVF_2$, dehydrohalogenation, since the perfluorocarbon resins do not include hydrogen in the polymer.

The predominant mechanisms of degradation in perfluorocarbon resins may include formation of peroxides and chain-cission, leading to lower molecular weight species. Even perfluorocarbon resins tend to have some proportion of functional end groups such as carboxylic acid groups. These can complicate any study of the degradation mechanisms, especially where the molecular weight of the resin decreases during the degradative process. Considering the higher temperature capabilities of PTFE compared to $PVF_2$, one cannot forecast what will happen with the perfluorocarbon resins from what has been tried with $PVF_2$, especially when applying the perfluorocarbon resins to uses at temperatures higher than the highest at which $PVF_2$ can be used.

Melt processible fluorine-containing resins, including polymers of tetrafluoroethylene such as with hexafluoropropylene, known as FEP, and also chlorotrifluoroethylene (CTFE) and PVF, but not including polytetrafluoroethylene homopolymer itself, are the subject of U.S. Pat. No. 4,248,736—Yoshimura, et al (Feb. 3, 1981). That patent uses a combination of an amine antioxidant, an organosufurous compound, and at least one of carbon black and iron, nickel or cobalt or other Group VIII metals to obtain improved thermal stability in the melt processible fluorine-containing resin. Although some of these resins are perfluorocarbon resins, others contain hydrogen. The maximum use temperatures for these polymers are not as high as those for PTFE, and several of the cited additives tend to be consumed rapidly at temperatures below the maximum use temperatures for PTFE.

Coating compositions containing PTFE, FEP, PFA and other perfluorocarbon resins separately or in combination, in formulations suitable for industrial and cookware applications, are known in several U.S. patents, including U.S. Pat. No. 4,252,859—Concannon and Vary (Feb. 24, 1981);

U.S. Pat. No. 4,123,401—Berghmans, et al (Oct. 31, 1978);

U.S. Pat. No. 4,143,204—Fang (Mar. 6, 1979);

U.S. Pat. No. 4,145,325—Vassiliou, et al (Mar. 20, 1979);

U.S. Pat. No. 4,147,683—Vassiliou, et al (Apr. 3, 1979);

U.S. Pat. No. 4,150,008—Vassiliou, et al (Apr. 17, 1979);

U.S. Pat. No. 4,169,083—Vassiliou (Sept. 25, 1979);

U.S. Pat. No. 4,180,609—Vassiliou (Dec. 25, 1979); and

U.S. Pat. No. 4,311,634—Vassiliou (Jan. 19, 1982), all of which are hereby incorporated herein by reference.

Zeolites are reversibly hydrated aluminum silicates generally containing alkali or alkaline earth metal oxides which sometimes can be ion exchanged for other metals or for hydrogen. A general structural definition is

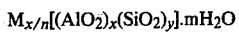

$$M_{x/n}[(AlO_2)_x(SiO_2)_y] \cdot mH_2O$$

wherein M is a cation of valence n, and n is 1 or 2. The ratio of x to y can vary from 1 to a large number, as is known in the art. Zeolites have a framework structure often permitting their use as molecular sieves after removing the water which can leave a void volume (depending on the value of m) of up to 50% with a narrowly defined pore size on the order of a few microns. Zeolites include many naturally occurring minerals and synthetic materials. The class of minerals known as feldspathoids is closely related to zeolites and is included herein in the meaning of the term zeolite. Feldspathoids, including sodalite and ultramarine, are more open in structure with large cavities than feldspars which are anhydrous. Thus, feldspathoids are more closely related to other zeolites than to feldspars.

SUMMRY OF THE INVENTION

The present invention provides compositions, including coating compositions, consisting essentially of PTFE resin containing zeolite which acts as a degradation retarder at elevated temperatures. Other fluorocarbon resins may be blended with the polytetrafluoroethylene resin in amounts which leave the melt viscosity at more than about $10^6$ poises at 380° C., while still retaining the unique characteristics which characterize the invention within the meaning of the term "consisting essentially". Such other fluorocarbon resins include, for instance, copolymers of tetrafluoroethylene (TFE) with hexafluoropropylene (HFP) known as FEP, and of TFE with perfluoropropylvinyl ether (PPVE), with or without HFP to form a terpolymer. Ultramarine blue contains sulfur species trapped in a cage structure from which it can be released gradually over an extended period of time (time release). Ultramarine blue is a preferred zeolite. Other zeolites containing sulfur or phosphorus, or even selenium or tellurium, in a crystallographic structure permitting similar time release may also be particularly desirable.

The coating compositions preferably include unsaturated hydrocarbon polymer, such as an acrylic resin, which decomposes at elevated temperatures to enhance the coalescence of the PTFE resin into the form of a film. These coating compositions also generally include a pigment, mica or a pigment-coated mica. The mica can give a sparkling appearance and tend to mask penetrating stains. When the pigment used as such or as a coating on the mica is an iron-containing pigment, to obtain certain colors or for any other reason, the iron content tends to enhance degradation of the perfluorocarbon resin at elevated temperatures. The cause is not known with certainty, but there may be some catalytic effect taking place with the iron oxide catalyzing the formation of peroxides which lead to degradation of PTFE.

DETAILED DISCLOSURE OF THE PREFERRED EMBODIMENTS

The degradation of PTFE at elevated temperatures in air is difficult to monitor. Because of the inherent elevated temperature capabilities of PTFE are so good, there seems to have been less effort directed toward further improving the elevated temperature capabilities of PTFE than for other lower temperature polymers such as PVC and $PVF_2$. However, above certain temperatures PTFE is not useful, and it does very slowly degrade even at certain high temperatures at which it is normally used.

We have found that iron oxide pigments have a tendency to accelerate the degradation of PTFE at elevated temperatures and that ultramarine blue provided as a particulate pigment tends to counteract that tendency.

EXAMPLES

The sample preparations are outlined in Tables I, II and III below. (Parts, proportions and percentages herein are by weight except where indicated otherwise.)

TABLE I

A PTFE aqueous dispersion of high molecular weight PTFE at a concentration of 60% in water with 6% isooctylphenoxy polyethoxyethanol surfactant "Triton X-100" available from Rohm and Haas, particle size 0.20–0.26 μm average diameter measured optically, available as T30 dispersion from E. I. du Pont de Nemours and Co.

B Acrylic resin solution acrylic latex polymer of methylmethacrylate, ethyl acrylate and methacrylic acid in a ratio of 39/57/4, at a concentration of 40% dispersed in water.

C Cerium octoate solution, containing 1.07% cerium being a blend of:

| | |
|---|---|
| 4.69% | cerium octoate (23% cerium) |
| 12.43 | dithylene glycol monobutyl ether |
| 31.02 | hydrocarbon solvent, 95% aromatic (Solvesso 100 from Exxon Chemical) |

TABLE I-continued

| | |
|---|---|
| 37.02 | triethanolamine |
| 9.85 | oleic acid |
| 4.99 | Triton X-100 surfactant |

D Red iron oxide pigment millbase of:

| | |
|---|---|
| 45.0% | calcined red $Fe_2O_3$ pigment R-2200 from Pfizer |
| 54.5 | deionized water |
| 0.5 | sodium lauryl sulfonate surfactant "Tamol SN" from Rohm & Haas |

E Ultramarine blue pigment millbase

| | |
|---|---|
| 45.01% | Ultramarine blue 5016 pigment coated with silica for acid resistance, made by Reckitts Colours Ltd. and sold by Whittaker, Clark & Daniels, Inc. |
| 0.25 | Triton X-100 surfactant |
| 0.25 | "Busperse 53" polymeric antiform agent from Buckman Laboratories International |
| 0.25 | triethanolamine |
| 55.24 | deionized water |

In the first set of preparations, PTFE dispersion, acrylic resin solution and cerium octoate solution were blended and into this were blended the red iron oxide millbase, the ultramarine blue millbase, and both together as shown in Table II.

TABLE II

| Sample | | | |
|---|---|---|---|
| 1 | A | PTFE | 62.58 |
| | | Triton X-100 | 1.95 |
| | C | Cerium octoate | 11.78 |
| | B | Acrylic resin | 11.69 |
| | | Deionized water | 10.88 |
| 2 | | Sample 1 | 98.88 |
| | D | Red iron oxide | 1.70 |
| 3 | | Sample 1 | 98.88 |
| | E | Ultramarine blue | 1.7 |
| 4 | | Sample 1 | 97.2 |
| | D | Red iron oxide | 1.7 |
| | E | Ultramarine blue | 1.7 |

The second set of preparations involved no acrylic polymer. The films were prepared by mixing the ingredients and drying them on a glass surface for 15 minutes at 150° C., then scraping them off. The sample compositions are given in Table III below.

TABLE III

| Sample | | | |
|---|---|---|---|
| 5 | A | PTFE | 166.6 |
| | C | Cerium octoate | 16.6 |
| 6 | A | PTFE | 166.6 |
| | C | Cerium octoate | 16.6 |
| | D | Red iron oxide | 4.4 |
| 7 | A | PTFE | 116.6 |
| | C | Cerium octoate | 16.6 |
| | E | Ultramarine blue | 4.4 |
| 8 | A | PTFE | 166.6 |
| | C | Cerium octoate | 16.6 |
| | E | Red iron oxide | 4.4 |
| | D | Ultramarine blue | 4.4 |

As is known in the art, zinc can be added to the ultramarine blue to aid in fixing the sulfur-containing effluents or in slowing down their rate of effluence when desired.

We claim:

1. A composition consisting essentially of polytetrafluoroethylene resin and zeolite, said composition having a melt viscosity at 380° C. of at least $10^6$ poises.

2. The composition of claim 1 in which the zeolite acts to retard oxidative degradation of the polytetrafluoroethylene resin at elevated temperatures.

3. The composition of claim 1 in which the zeolite contains sulfur or phosphorus in a crystallographic configuration which permits gradual release of the sulfur or phosphorus.

4. The composition of claim 1 in which the zeolite is ultramarine blue.

5. A coating composition comprising the composition of claim 1.

6. The coating composition of claim 5 also containing an unsaturated hydrocarbon polymer which decomposes at elevated temperatures but below the melting point of the polytetrafluoroethylene.

7. The coating composition of claim 6 in which the unsaturated hydrocarbon polymer acts as a coalescing aid to enhance film formation by the polytetrafluoroethylene.

8. The coating composition of claim 7 in which the unsaturated hydrocarbon polymer is an acrylic polymer and which also contains an oxidation catalyst to aid in decomposing the acrylic polymer.

9. The coating composition of claim 8 which also contains at least one of pigment, mica, and pigment-coated mica.

10. The coating composition of claim 9 in which the pigment includes an iron oxide.

11. The coating composition of claim 10 in which the zeolite is ultramarine blue.

* * * * *